United States Patent [19]

Violino

[11] 4,059,748
[45] Nov. 22, 1977

[54] COMPUTER ACCOUNTING SYSTEM

[75] Inventor: Ettore Violino, Ivrea (Turin), Italy

[73] Assignee: Ing. C. Olivetti & C., S.p.A., Ivrea (Turin), Italy

[21] Appl. No.: 663,951

[22] Filed: Mar. 4, 1976

[30] Foreign Application Priority Data

Apr. 8, 1975 Italy .................................. 67888/75

[51] Int. Cl.² .......................................... G06F 11/00
[52] U.S. Cl. .......................... 235/303.1; 340/146.1 F; 360/2
[58] Field of Search ........... 340/146.1 BA, 146.1 AX, 340/149 A; 235/153 AH, 153 BK, 153 R, 61.7 R, 61.7 A, 61.7 B, 61.11 D

[56] References Cited
U.S. PATENT DOCUMENTS

| 2,913,707 | 11/1959 | Goldberg et al. | 340/146.1 BA |
| 2,985,714 | 5/1961 | Barbeau et al. | 340/146.1 BA |
| 3,037,698 | 6/1962 | Saxenmeyer | 235/153 BK |
| 3,131,377 | 4/1964 | Grondin | 340/146.1 BA |
| 3,142,817 | 7/1964 | Vallen | 235/153 AH |
| 3,324,460 | 6/1967 | Leonard et al. | 340/146.1 BA |
| 3,427,585 | 2/1969 | Milford | 340/146.1 BA |
| 3,582,880 | 6/1971 | Beausoleil et al. | 235/153 AH |
| 3,719,929 | 3/1973 | Fay et al. | 340/146.1 BA |
| 3,806,715 | 4/1974 | Acriprete et al. | 235/61.7 R |
| 3,898,432 | 8/1975 | Agnew et al. | 235/61.7 B |

Primary Examiner—Charles E. Atkinson
Attorney, Agent, or Firm—Schuyler, Birch, Swindler, McKie & Beckett

[57] ABSTRACT

There is disclosed an accounting system comprising a computer, an insertion device for receiving and printing on a card and including means for writing information on and reading information from a magnetic track on the card. A control unit operates in conjunction with the computer to control feed of the card in the insertion device and the said writing and reading operations, and to detect the occurrence of errors in the reading or writing. A register is arranged to count the number of times that a reading or writing operation has been performed. When an error is detected the computer repeats the operation until either the operation is performed without an error being detected or the register indicates that the operation has been repeated a predetemined number of times.

4 Claims, 13 Drawing Figures

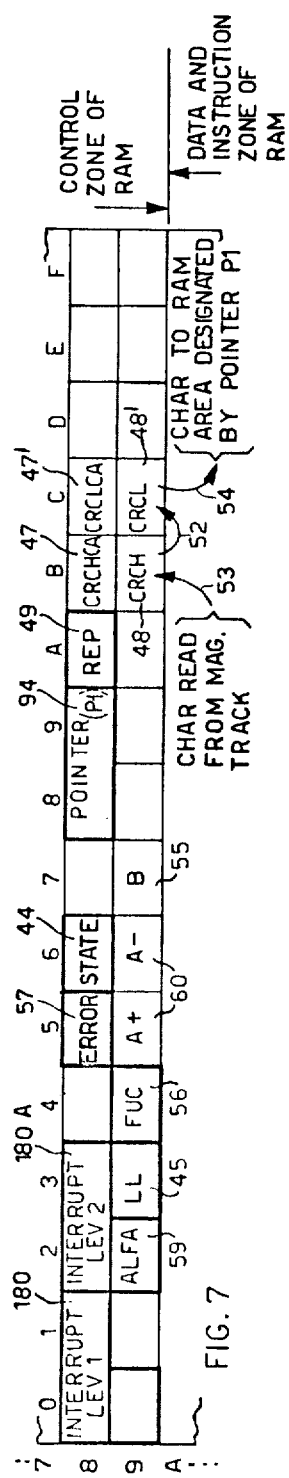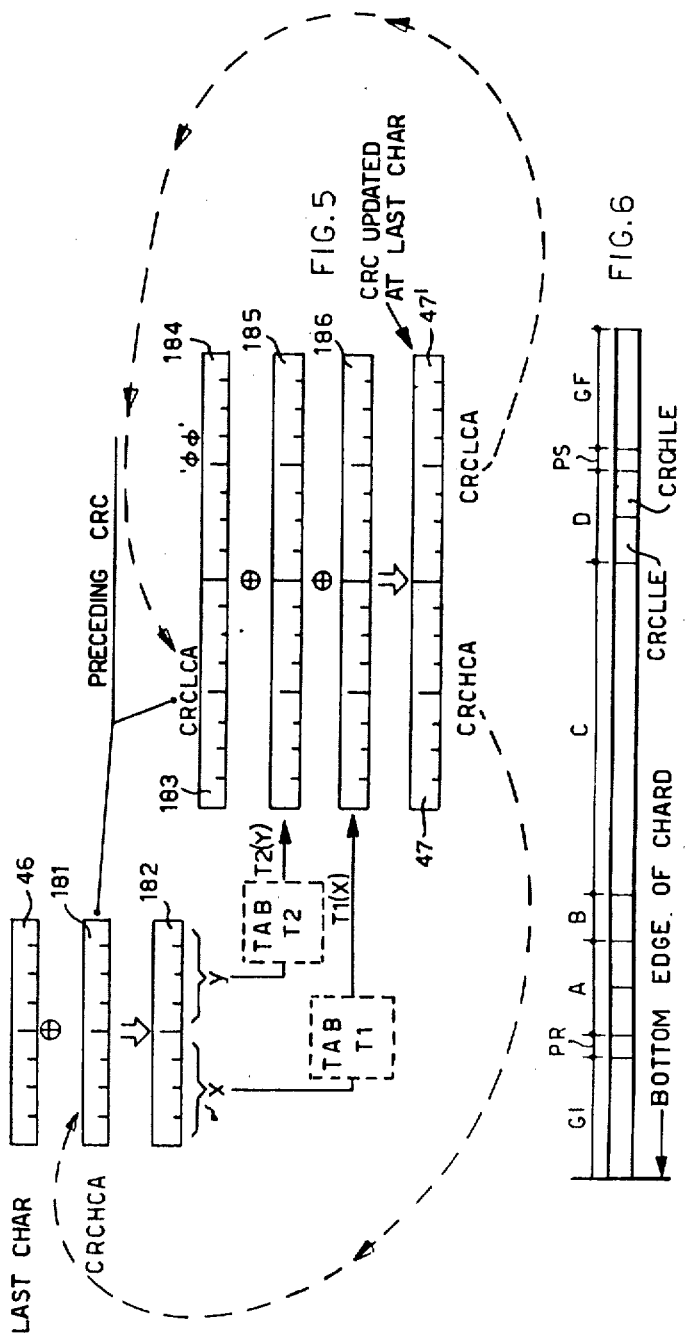

COMPUTER ACCOUNTING SYSTEM

BACKGROUND OF THE DISCLOSURE

1. Field of the Invention

The present invention relates an accounting system comprising a computer and an insertion device for receiving and printing on account cards.

In microcomputers oriented for accounting purposes, there is the need to record the data on an account card provided with a magnetic track. The use of these cards causes difficulties during the various operations on the same card since the positioning thereof at a given line shows differences of alignment. These differences of positioning are due to the fact that, the card being made of thin card material and being very wide, a considerable clearance is required between its width and that of the guides. In the end, this clearance is manifested in difficulty of operation on the magnetic track, inasmuch as there is the possibility of a reading error due to the angular displacement of the card. 2. Description of the Prior Art In a known arrangement, after recording the information on the magnetic carrier, it is read and compared (the exclusive-OR operation is performed), character by character, with the original message stored in a buffer. If a difference is found between any two characters, an error signal is emitted and invalidates the card.

This arrangement has the drawback of declaring cards which are still valid as invalid solely because of the detection of an error during the sequence of verification after the recording operation; moreover, if the operator wishes to assure himself of the actual invalidity of the card, he must command other reading cycles manually. The problem, therefore, exists of having available a more efficient arrangement for determining whether a card is actually invalid before declaring it such.

SUMMARY OF THE INVENTION

According to the present invention, there is provided an accounting system comprising a computer, an insertion device for receiving and printing on a card and including means for writing information on and reading information from a magnetic track on the card, and a control unit operating in conjunction with the computer to control feed of the card in the insertion device and the said writing and reading and to detect the occurrence of errors in the reading or writing, wherein a register is arranged to count the number of times that a reading or writing operation has been performed and the computer is arranged, when an error is detected, to repeat the operation until either the operation is performed without an error being detected or the register indicates that the operation has been repeated a predetermined number of times.

It is, moreover, important to optimize the time of verification following the recording of the magnetic track. Moreover, for accounting microcomputers, in which the user memory is very small, it is preferable that the reading of the magnetic track be reducible to the indispensable information only. Thus, in some cases it is desirable to be able to transfer to the memory only a part of the zone recorded on the magnetic track. This causes problems of control of the information transferred and, moreover, in conventional systems, requires the reading movement to be arrested at the end of the zone to be transferred. These desirable facilities are provided in the preferred embodiment of the invention as will be explained below.

BRIEF DESCRIPTION OF THE DRAWINGS

FIG. 5 is a schematic diagram of the operations relating to a polynominal check;

FIG. 6 shows the format of the information on the magnetic track of the card;

FIG. 7 shows the reserved zone part utilised in the memory;

DETAILED DESCRIPTION OF THE INVENTION

Figure 1:
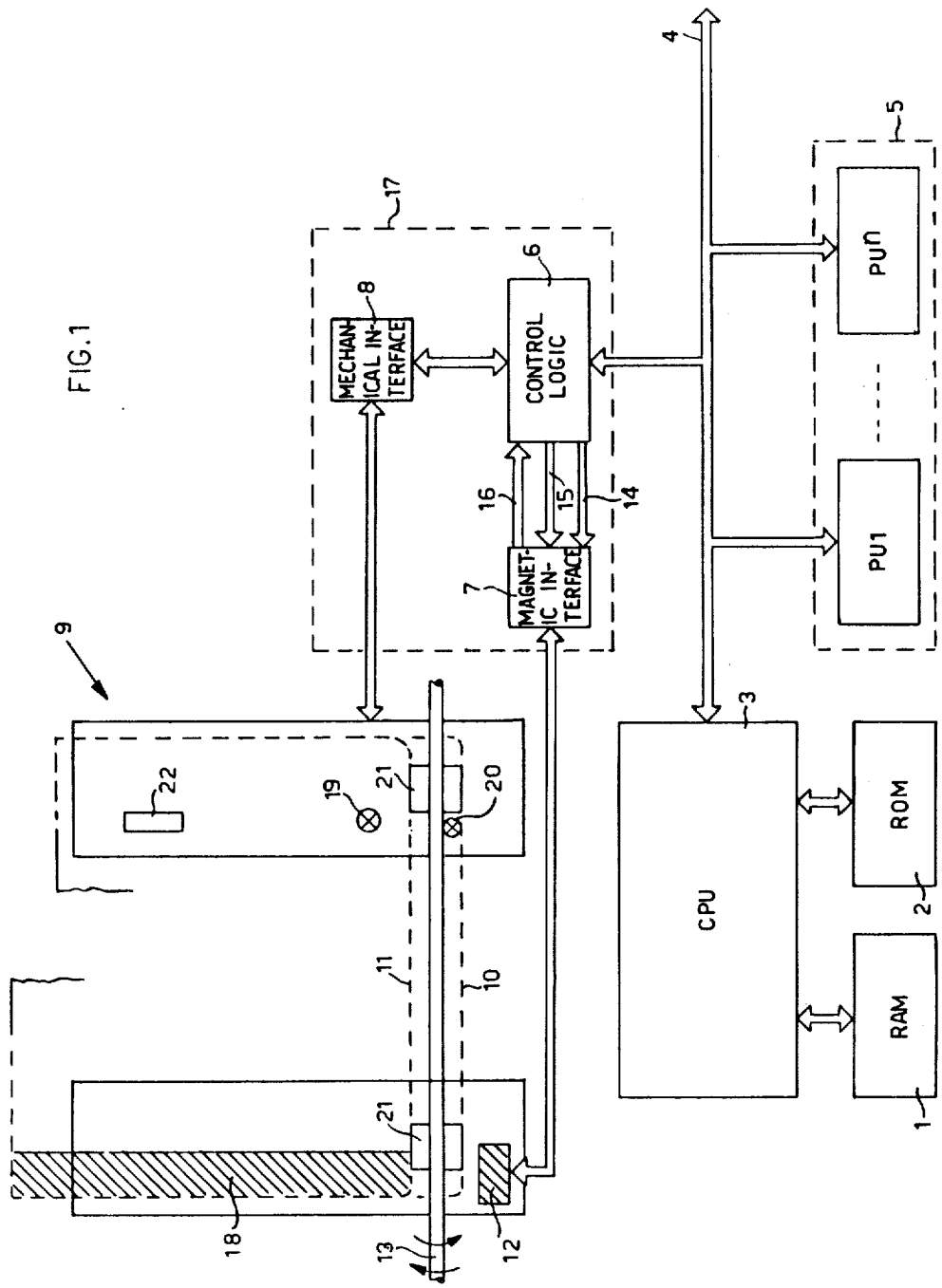
FIG. 1 is a block diagram of an accounting microcomputer using a system embodying the invention.

The accounting microcomputer shown in FIG. 1 is composed of a main memory RAM 1 adapted to contain data and instructions; a read-only memory ROM 2 adapted to contain the microprograms which produce the commands necessary for performing the operations; a CPU 3 comprising a series of registers, control circuits and computing units adapted to be controlled by the microinstructions originating from the ROM 2; a series of peripheral units PU1 to PUn indicated generally by the reference 5 and connected to the CPU 3 by means of an input/output channel 4; and finally the peripheral unit for processing magnetic cards which is composed of a control unit 17 and a front insertion device 9. Obviously, the RAM 1, ROM 2, CPU 3 and peripheral units 5 will not be described inasmuch as they do not concern the invention. These parts, however, are widely known in the art and may be of any known type. The RAM 1 is, however, assumed to consist of registers each of which contains 16 8 bit byte cells denoted 0, 1, . . . 9, A, . . . F, as in FIG. 7. This Figure, which will be described below, also assumes that a control zone of the RAM, inaccessible to the programmer, extends up to registers 8 and 9, following which registers A, B, etc., form the data and instruction zone accessible to the programmer.

The control unit 17 constitutes the electrical and mechanical control logic of the front insertion device 9. Its function consists essentially in converting the data and commands coming from the CPU 3 by way of the channel 4 into the commands, both mechanical and electrical, for the front insertion device 9. In particular, control logic 6 sends, via a mechanical interface 8, the command signals for the electromagnets which control: the starting of a card transporting or driving motor (which actuates feed rollers 21 on a shaft 13);

the direction of rotation of the motor (intake or ejection of cards);

a line-spacing clutch (which permits discrete movements of the card for the printing of the data);

a brake for the motor;

The control logic 6 receives from the interface 8 the signals for:

"card present" state of a microswitch 22;

"card ready" state of a phototransistor 19, which advises when a card is resting on the transporting rollers 21 (as indicated by the dashed line 11 in FIG. 1) and is ready to be introduced. This condition is also obtained in the case of "card ejected" after a reading or writing operation;

"card/lowered" state of a phototransistor 20 which signals the passage of the card beyond the axis of the transporting rollers, as indicated by the dashed line 10.

The control logic 6 also passes data to and receives data from two magnetic heads 12 which co-operate with a timing track and a data track on a magnetic strip 18 down the left-hand edge of the card. Data is transferred via a magnetic interface 7 which includes the necessary amplifiers establishing signal levels.

The control logic 6 communicates with the magnetic interface 7 through:

a. a writing bus 14 carrying the two signals which command the two heads corresponding to the timing track and the data track;

b. a command bus 15 which carries:

a signal enabling writing, which supplies the current to the magnetic head;

a signal enabling reading;

a signal which, in the case of verification, makes the reading conditions very bad, reducing the sensitivity of the head;

c. a reading bus 16 which carries:

a clock signal for the bits read;

the information bits read;

a signal which indicates the presence of information bits on the magnetic track.

Figure 2A:
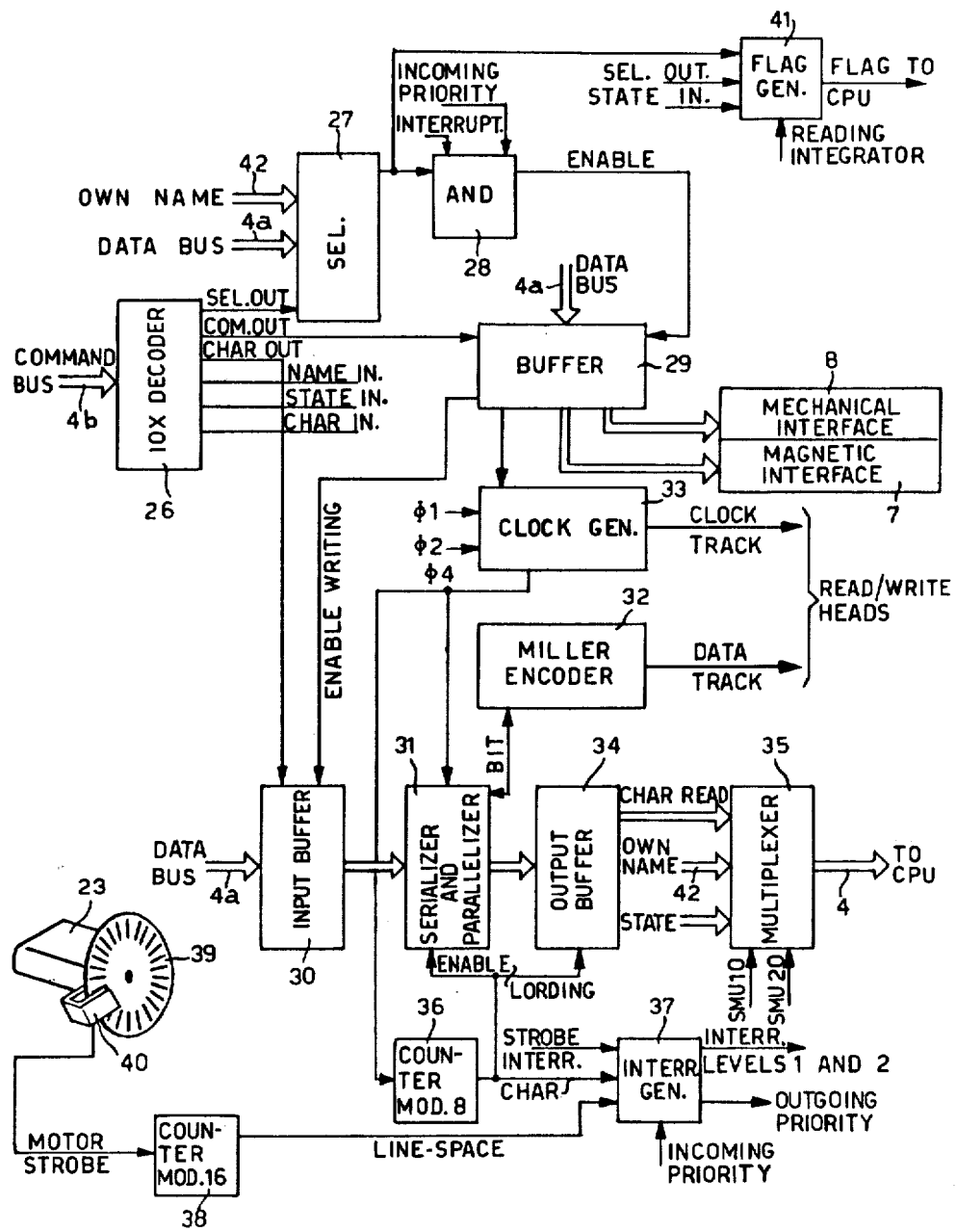
FIG. 2a is a block diagram of the control logic of the front insertion device.
Figure 4:
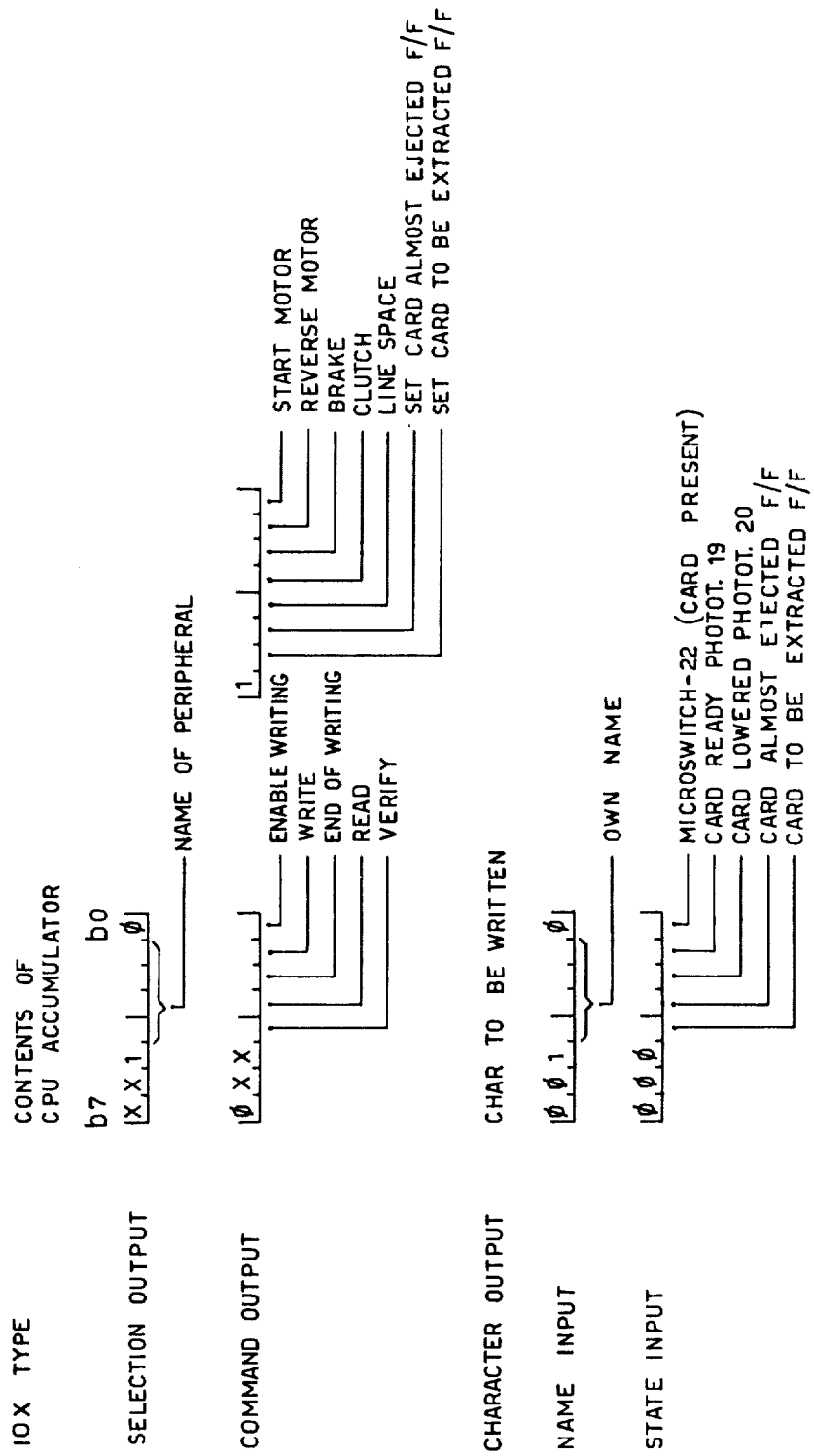
FIG. 4 shows the input/output microinstructions (IOX) and the contents of the accumulator of the CPU (central processing unit) during the exchanges with the peripheral units.

The control logic 6 converses with the CPU 3 by means of the input/output microinstructions indicated by the reference IOX in FIGS. 2a and 4. The input/output channel 4 (FIG. 1) is made up of a data bus 4a (FIG. 2a), which carries bits $b_1$ to $b_4$, and a command bus 4b. In the case of OUTPUT and INPUT type IOX's, the peripheral unit which carries bits $b_o$, $b_5$, $b_6$ and $b_7$ receives an output from and sends an input to the CPU, respectively.

The significance of the microinstructions IOX is indicated in FIG. 4, where an explanation of the individual bits used is given. In FIG. 2a, reference is made to the descriptions of FIG. 4 for the use of the signals. The control logic 6 will now be described with reference to FIGS. 2a and 2b.

A decoder 26 has the task of recognizing the microinstructions IOX and of enabling the other blocks of the control logic 6 according to the command contained in the microinstructions IOX itself. To communicate with a peripheral unit (PU), the CPU 3 sends the SELECTION OUTPUT IOX (FIG. 4) with the name of the PU in bits $b_1$ to $b_4$. This IOX enables a selection unit 27 which provides an output if the incoming PU name matches its own name hard wired on an own name bus 42. In addition to the selection, because the control logic 6 can converse with the CPU 3, it is necessary that an enabling signal be present. This signal is generated by an AND gate 28 when the CPU is working on a level of lower priority (Indicated by INTERRUPT), or is executing a service microprogram initiated by the control logic 6 itself, (indicated by INCOMING PRIORITY).

The control logic 6 includes a flag generator 41 which responds to the signal from the selection unit 27 to indicate to the CPU (via channel 4) that an own name recognition has been made.

As is shown in FIG. 4, a command output microinstruction IOX loads the magnetic and mechanical commands into a buffer 29. The magnetic and mechanical commands are distinguished by the bit 7 of the data bus. From the buffer 29, the mechanical commands (bit 7 = 1) go directly via the interface 8 to the electromagnets of the mechanism 9. The first four mechanical commands are self-explanatory. The commands SET CARD ALMOST EJECTED F/F and SET CARD TO BE EXTRACTED F/F set bistable flip-flops (not shown) which are reset by the phototransistors 19 and 20 when the card reaches the positions 11 and 10, respectively, in FIG. 1. On the other hand, the magnetic signals (bit 7 = 0) operate in part directly on the data interface 7 and in part they enable other sections of the controller. These sections are constituted by the following elements: Input buffer 30, which is enabled by the ENABLE WRITING command and receives the data from the data bus 4a included in the channel 4 and transmits it to a serializer/parallelizer 31 for recording or writing. The serializer/parallelizer 31 transmits the individual bits to a Miller encoder 32 which, together with a clock signal generator 33, records the data on the data track and the clock signals on the clock signal track, respectively, through the medium of the magnetic heads 12 (FIG. 1). The data is, therefore, recorded in accordance with the Miller code known in the art.

Conversely, the data read by the heads 12, through the medium of the blocks 31, 32 and 33, is parallelized and staticized in a buffer 34. From the buffer 34, via a multiplexer 35, the data is sent to the data bus in the channel 4, which conveys it to the CPU 3. A counter 36 counts the 8 bits of a character and generates an interrupt of level 1 via a circuit 37 for each character ready in the buffer 34 (in the case of input into the CPU 3) or in the buffer 30 (in the case of output from the CPU 3). The logic network 37 generates another interrupt (of level 2 and, therefore, of lower priority) in the case of execution of a line-spacing operation during the printing on the card. A motor 23 supplies the movement to the card driving rollers 21. It is, moreover, provided with a disc 39 keyed on its shaft. This disc is provided with 48 radial slits and with a phototransistor unit 40 adapted to supply 48 strobe signals for each revolution of the driving shaft. The strobe signal is fed to a counter 38, which counts modulo 16 and thus supplies three signals for each revolution of the motor. These signals correspond to the line-spacings carried out by the card starting from the bottom edge. In consequence, the circuit 37 emits an interrupt signal at level 1 for each character received or transmitted, and an interrupt signal at level 2 for each line-spacing carried out. The line-spacing interrupt is activated whether the line-spacing is carried out during introduction or during ejection.

Figure 2B:
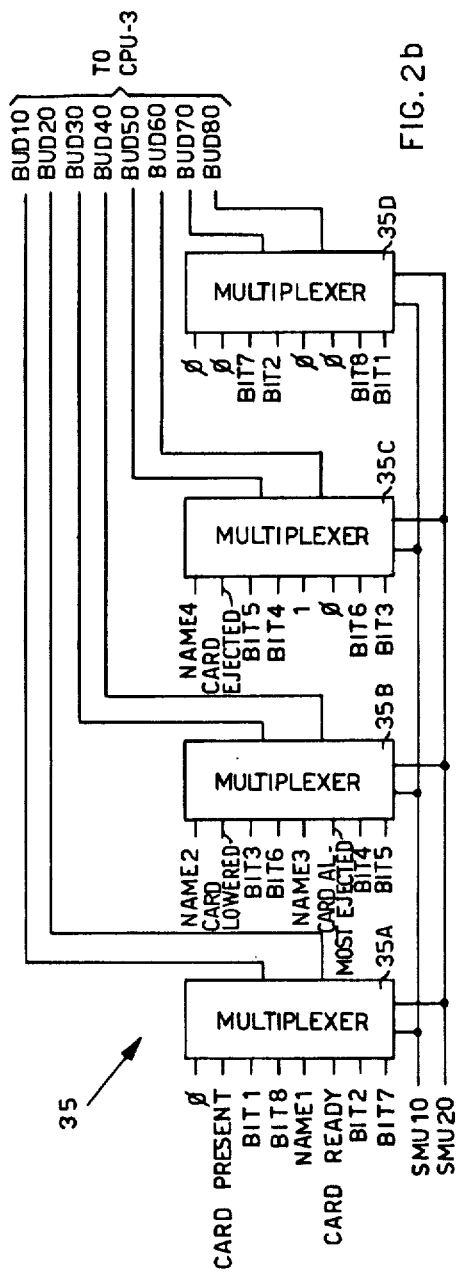
FIG. 2b is a detailed logic diagram of a multiplexer.

FIG. 2b shows the multiplexer 35 used for INPUT states. It can be seen, therefrom, how it is possible to send data with different significances to the CPU 3. The selection of the input is effected by signals SMU10 and SMU20, which are activated by the decoder 26 on the basis of the code of the microinstruction IOX as shown by the Table included in FIG. 2b.

In the case of NAME INPUT, the first and fifth input of each multiplexer 35A to 35D are selected by SMU10 = SMU20 = 0 for connection to the lines BUD10 to BUD80 of the channel 4, so that the data sent has the format, reading from the most significant end, $\phi$, $\phi$, 1, NAME 4, NAME 3, NAME 2, NAME 1, $\phi$ where NAME 4 to NAME 1 are the bits of the OWN NAME of the PU wired in on the bus 42 of FIG. 2a. The name of the PU is thus sent to the CPU in accordance with the format of FIG. 4.

For STATE INPUT, with SMU10 = 1 and SMU20 = 0, the second and sixth inputs of the multiplexers are selected and it can be seen that the information sent to the CPU is in accordance with FIG. 4. In the CHARACTER INPUT state, READ, SMU10 = 0 and SMU20 = 1. The third and seventh inputs are selected and bits 1 to 8 are sent on BUD10 to to BUD80 respectively. Thus, in the reading stage, the characters read are sent to the CPU3 with the bits in the same reading order. In the verification stage, on the other hand, (SMU10 = SMU20 = 1), the multiplexer 35 selects the fourth and eighth inputs of each component (35A - 35D). The result is that the character read is sent to the CPU 3 with the bits in reverse order. The reason for this reversal is the fact that the direction of reading for verification is opposite with respect to the direction for recording or writing (see FIG. 3). Therefore, during verification, the bits recorded on the card are read from the track in the reverse order, that is firstly the bit 8 and lastly the bit 1. Therefore, so that a comparison between the bits read and those recorded in the RAM 1 may be possible, it is necessary to reverse the order of the bits read. This is done, as has been seen, by the multiplexer 35. The verification is effected in the opposite direction to that of recording in order to optimize the movements of the card and therefore halve the time of execution of the recording and verification cycle.

OPERATION

The instructions which concern the control logic 6 are:

Reading of the card: RD, LL
Writing on the card: WR, LL
Commands: COM, XX.

As commands there are meant the instructions for testing, card ejection and carrying out of line-spacing on the card. LL indicates the length of the message to be transferred, XX the type of command. The operations carried out on the magnetic card are summarized briefly here.

During the execution of the program, reading from a magnetic card is requested. The request for insertion of the card is signalled to the operator by the lighting-up of a lamp which called AFF (Automatic Front Feed). The operator introduces the card into the insertion device 9 and the signals originating from the microswitch 22 and from the phototransistor 19 inform the CPU 3 that the card is present. The reading of the magnetic track is effected by moving the card in the direction indicated in FIG. 3. The card is arrested at the first line-spacing following the end-of-reading signal.

FIG. 6 shows the format along the data track of the card. Starting from the bottom edge of the card the fields are as follows:

GI: Initial gap
PR: Preamble character
A: Last line address printed on the card
B: Card code
C: Information message
D: Control Characters
PS: Postamble
GF: Final gap.

During the reading, two check characters are calculated, using a "cyclic redundancy code" (CRC), these characters being indicated by CRCLCA and CRCHCA in FIG. 7. (See "Cyclic Codes for Error Detection", Peterson and Brown, Proc. I.R.E. January 1961, page 228). At the end of the reading on the magnetic track, the check characters should correspond to the CRC characters calculated during the last writing operation carried out on the card. These latter two characters are recorded as the last two characters at the end of the writing operation in field D and are called the read CRC and will be indicated by the labels CRCHLE and CRCLLE to distinguish them from those calculated during the reading of the track. At the end of the reading, the check bytes are compared, CRCHLE with CRCHCA and CRCLLE and CRCLCA. If no differences are found, the reading has been finished without any errors; otherwise, the card is ejected and the reading is repeated. As will be seen from the flow diagram of FIG. 8, the reading is carried out at the most three times and then the card is ejected, signalling the reading error to the operator. If the reading takes place without errors, the positioning of the card at the line space indicated by the fields B given in FIG. 6 is carried out. At this point, the work of updating true and proper is carried out on the card, which provides for the printing of the data. When this stage has been terminated, a writing operation is carried out on the magnetic track to update the data contained therein. The amount of this data, and thus the length of field C in FIG. 6, may vary within the limits permitted by the length of the card and, for example, in FIG. 3 there is carried out a writing longer than the previous reading. The writing is preceded by practical ejection of the card; the position that the card adopts in this stage is indicated by the reference 10 in FIG. 1. The data is then written on the card and at the same time the CRC characters are calculated. The last two CRC characters calculated (CRCLCA and CRCHCA) are recorded after the information (field C) in field D of FIG. 6, thus becoming CRCLLE and CRCHLE.

Figure 3:
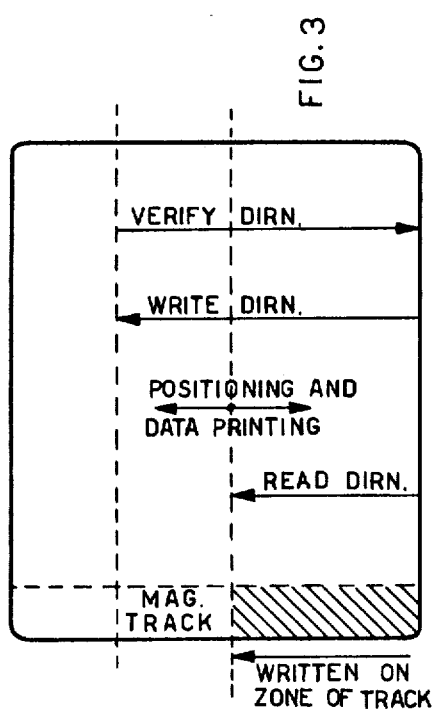
FIG. 3 is a diagram of a card having a magnetic track.

After the writing operation, the ejection of the card is carried out, coupled with reading for verification of the data written. The verification is a reading stage but with the threshold of sensitivity of reading reduced for the purpose of simulating a deterioration in the read signal. This deterioration is present in fact, if the reading of the card is effected a very long time after the writing. As shown in FIG. 3, the verification is effected by reading the characters of the message in the opposite direction, and also the individual bits of the character are read in the reverse order. During the verification, the characters read, including CRCLLE and CRCHLE, are compared with corresponding characters recorded in the RAM 1. On the result of the comparison depends the ending or not of the writing. If there is an error, the writing is repeated for a maximum number of two times.

CALCULATION OF THE REDUNDANCY CODE

The CRC (FIG. 5) is calculated with the aid of tables, by working out a series of exclusive-OR operations on the characters of the message and accumulating the partial results obtained. Two tables with 16 addresses which contain words two bytes long are required. In FIG. 5, these tables are indicated by the references T1 and T2, while T1(X) and T2(Y) indicate the words selected by the half bytes X and Y, constituted by the contents of a register 182. The 4 bits of each half byte decode to one of 16 addresses. The half bytes X and Y are obtained from the exclusive-OR (symbolized by a + sign in a circle) of the character CRCHCA and the current character of the message.

Registers 8 and 9 of the ROM 1 (FIG. 7) are used in control of card reading and writing and cells 47 and 47' are used to contain CRCHCA and CRCLCA. Initially, these cells are zeroized. At each reading, the character read is entered in a register 46 (FIG. 5) and CRCHCA is transferred to a register 181. The contents of these registers are used to form the contents of register 182 as noted above. CRCLCA is transferred to a register 183 which is extended to two-bytes by a register 184 holding all zeroes, i.e., both half-byte characters zero. T2(Y) and T2(X) are entered in registers 185 and 186 and the exclusive OR function of registers 183/184, 185 and 186 forms the new contents of the cells 47 and 47' in the RAM. The character read is transferred from register 46 to a cell 48 of the RAM (arrow 53 in FIG. 7). The previously read character is shifted to cell 48', arrow 52.

The character from cell 48' goes to the cell of the RAM designated by the pointer P1, (arrow 54). The cells successively designated by the pointer P1 plus the cells 48, 48' form a character stack of the first in, first out type with characters entered at cell 48 and read out at cell 48'.

At the end of a reading operation, the two characters CRCHLE and CRCLLE remain in the cells 48, 48', while in the cells 47, 47' there are characters CRCHCA and CRCLCA. A comparison of these CRC characters determines repetition or not of the reading or writing in progress.

RESERVED MEMORY ZONE REGISTERS 8 and 9.

The memory zone which terminates at the address 9F of the RAM is inaccessible to the programmer since it constitutes the backing registers used by the hardware. Two cells 180 contain the address of the ROM at which the microprogram handling the interrupts of level 1 begins, while two cells 180A appertain to the microprogram handling the interrupts of level 2. A cell 57 (address 85), if it contains a zero, indicates that the reading or writing on a magnetic carrier has taken place without any errors, and the opposite if it contains one.

A cell 44 contains the state of the control logic 6 and the individual bits have the significance given in FIG. 4. Two cells 94 contain a pointer P1 which addresses the cell of the RAM in which is deposited the character read from, or to be written on, a magnetic card. A cell 49 contains the number of times (repetitions) that a reading or writing sequence has been repeated on a magnetic card. The cells 47, 47', 48 and 48' have already been described. A cell 59 is used as a counter for a number designated ALFA during the instructions RD and WR. A cell 45 contains the length LL of the characters to be transferred from the magnetic track to the memory or vice versa. A cell 56 contains a code FUC which indicates that the instruction RD or WR is completed. Cells 60 and 55 contain the fields A and B read from the magnetic track (see FIG. 6).

READING INSTRUCTION: RD

Figure 8:
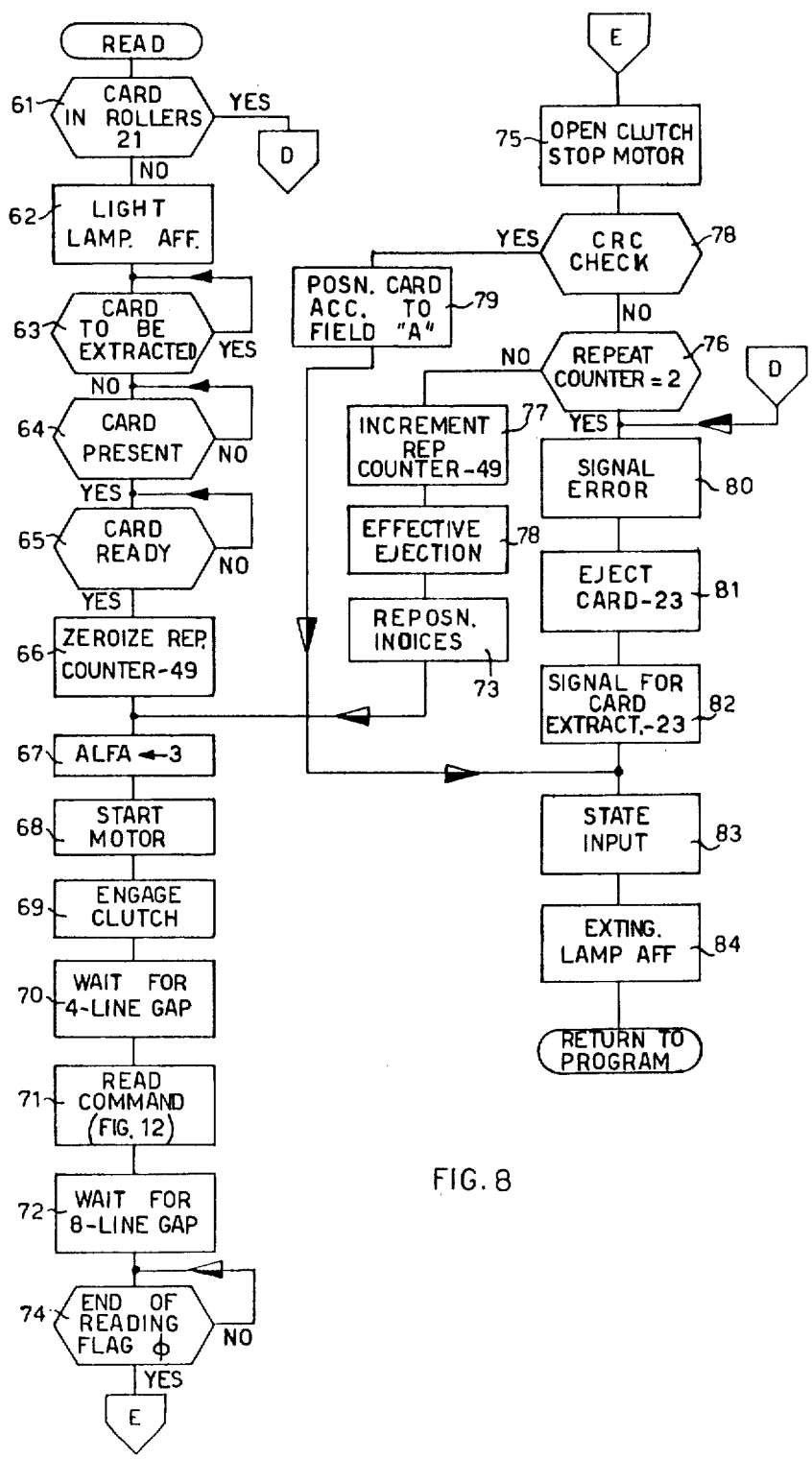
FIG. 8 shows the flow diagram of the instruction for reading the magnetic track of the card.

The flow diagram corresponding to the microprogram of the reading instruction RD is shown in FIG. 8. The logic level 61 checks whether a card is positioned as the card indicated by the reference 10 in FIG. 1. This check is made by analyzing the contents of the state cell 44 (FIG. 7) in which has been previously recorded the state of the control logic as shown in FIG. 4, using the state input instruction IOX. More particularly, there is examined the bit relating to the microswitch 20 which signals a "card lowered" condition.

In the affirmative case, a jump is made to the block 80 (FIG. 8), at which an error is signalled and the reading is not effected. In the negative case, the lamp AFF is lit (block 62), which requires the operator to introduce the card to be read. The block 61 serves to prevent a card on which operations have been previously effected being read. This avoids the processing operations already effected beforehand being erroneously repeated on the same card. In other words, the reading of the magnetic track, since it introduces into memory the state relating to a certain piece of work, must be effected at the beginning of the processing operations concerning that card, otherwise this reading introduces an erroneous state in the program. The logical decisions 63, 64 and 65 check the position of the switch 22 and of the phototransistor 19 to verify that the operator has replaced the card. More particularly, the logical decision 63 analyzes the state of the microswitch 22 and the decision 64 only after the operator has extracted the card (the microswitch 22 changes state from level 1 to level 0). The decision 64 enables the decision 65 to be examined when the microswitch 22 has returned to level O owing to the introduction of the new card. Finally, the logical decision 65 enables the machine to go on to the block 66 only after the new card actuates the phototransistor 19. The block 66 sets the repeat counter 49 (FIG. 7) at zero; this counter is examined by the block 76 in the case of a reading error. The block 67 writes the number 3 in the ALFA cell 59 (FIG. 7). This cell enables the fields A and B recorded on the magnetic track to be transferred to the cells 60 and 55 of the zone of the RAM 1 reserved for the deposit of data relating to the microprograms (see FIGS. 6 and 7) and to the zone of the RAM intended for the magnetic track. The blocks 68 and 69 send the electromechanical commands for starting of the motor and for engagement of the clutch of the rollers 21 (FIG. 1). The block 70 commands a wait (corresponding to four line-spacing signals) to enable the initial gap GI (FIG. 6) to pass below the magnetic head 12. The block 71 sends the first reading command by mens of an interrupt of level 1. The operations involved by the microprogram handling the transfer at level 1 are shown in the flow diagram of FIG. 12. At the end of the reading, the block 72 waits 8 lines for the final gap GF shown in FIG. 6. The logical decision 74 waits until the control unit 6 emits the end-of-reading flag, while the block 75 arrests the motor and disengages the card driving clutch. The logical decision 78 carries out the polynomial CRC check explained above. If the cells 47, 47' and 48, 48' have like contents, block 79 is executed and effects the positioning of the card at the first free line, the address of which is read from the field A of FIG. 6. If, on the other hand, the polynomial CRC check signals an error, the logical decision 76 is executed, which checks the contents of the repeat counter 49 (FIG. 7). If the contents of the counter equal two, three reading attempts have already been made and, therefore, the card is ejected because of erroneous reading. If, on the other hand, the contents of the counter are less than 2, block 77 is executed, which increments the counter. The block 78 repositions the card in the position 10 of FIG. 1 and then a jump is made to the block 73. Starting from this block the reading of the magnetic track is repeated as has been described. If, on the other hand, the contents of the repeat counter = 2, the block 80 is executed, which signals the presence of errors in reading from the magnetic carrier. The block 81 brings the card into the ejection position indicated by the reference 11 in FIG. 1. The block 82 signals to the operator that it is necessary to extract the card. The block 83 executes the input of the state of the mechanical parts, while the block 84 extinguishes the lamp AFF. Finally, the carrying out of the following instruction of the program is executed.

Figure 12:
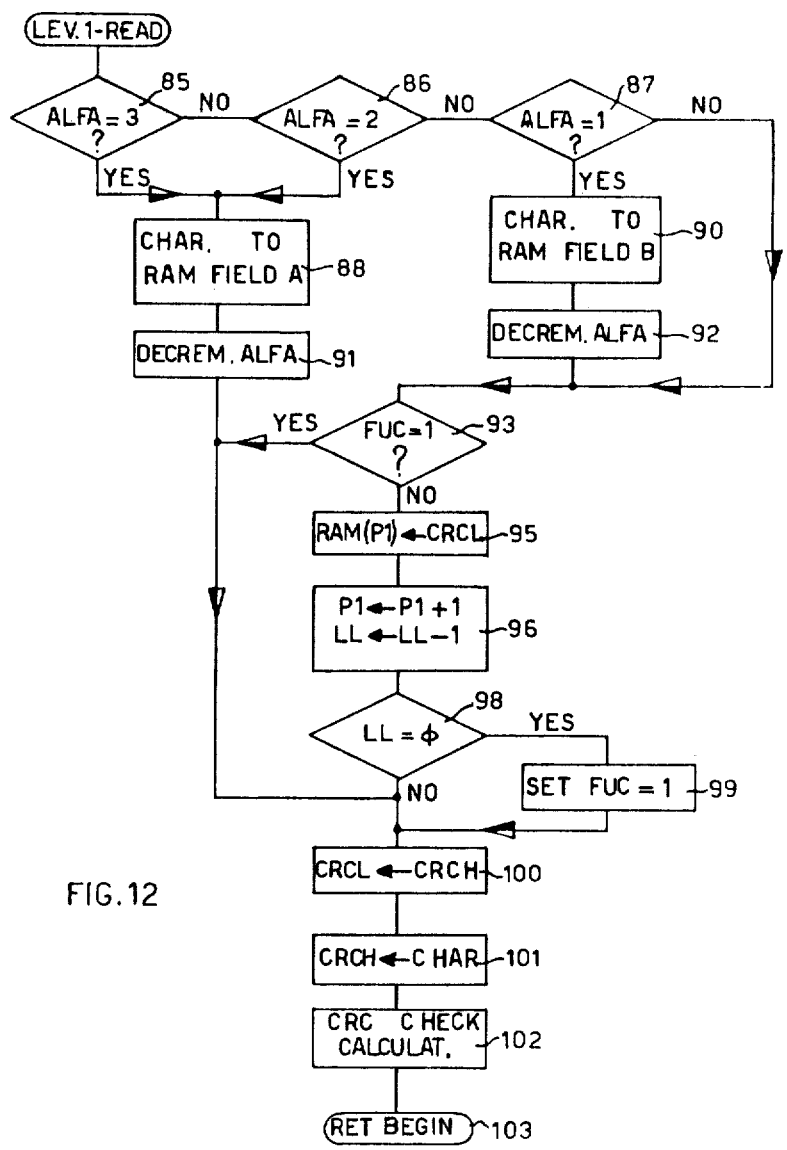
FIG. 12 shows the flow diagram of the reading of a character from the magnetic track.

The reading command represented by the block 71 (FIG. 8) is carried out by means of the flow diagram of FIG. 12. The microprogram described by FIG. 12 is executed for each character transferred to the RAM 1. It can be seen therefrom how the ALFA cell 50 (FIG. 7) serves to permit the transfer of the fields A and B (FIG. 6) to the zones 60 and 55 of the reserved memory zone (FIG. 7), in addition to the zone of the RAM suitably intended to contain the data read from the track. This is shown by the blocks 85 to 92. If ALFA is 2 or 3 (blocks 85 and 86), block 88 causes the characters read from zone A of the track (FIG. 6) to pass to cells 60 of the RAM (FIG. 7), following by decrementing of ALFA (block 91). Moreover, after the reading of the first and second characters of the field A, a jump is made to execute the block 100, which consists of the transfer 52 (FIG. 7), that is from the cell 48 to the cell 48'. The block 101, on the other hand, effects the transfer indicated by 53 in FIG. 7, that is from the accumulator to the cell 48. In block 102, the CRC check calculations are performed and return is made to the beginning, block 103. As is shown in FIG. 12, the first two characters introduced into the area 48 of the reserved memory zone do not give rise to the transfer indicated by 54 in FIG. 7, that is to the transfer from the cell 48' to the cell of the RAM intended for the data that is read. This is due to the fact that, during the transfer of these characters, the cell 48' (CRCL) contains nonsignificant information. Starting from the third character transferred — to cell 55 — (blocks 87, 90 and 92 of FIG. 12), the transfer 54 of FIG. 7 is activated by means of the block 95, so long as block 93 does not indicate completion of the instruction. The block 96 increments the address pointer P1 in cell 94 of the transfer 54 and decrements the residual length LL of the transfer contained in the cell 45, compiled by other instructions as described hereinbefore. The logical decision 98 senses whether this length LL is zero and, in the affirmative case, signals the end-of-the-reading by means of the block 99, which writes 1 in the FUC cell 56. The contents of this cell are sensed by the block 93 at the succeeding character transferred. With FUC = 1, all the characters read successively from the magnetic track have been transferred to the cell 48 of the reserved memory zone and from here to the cell 48', but because the transfer 54 is inhibited when FUC = 1, only the desired characters are transferred to the data and instruction zone of the RAM. This is another characteristic of the system which is very convenient for the operator.

Thus, the operator can define a reading length LL of a size smaller than the zone written on the card in fields A to D (FIG. 6). In fact, in this case, the first LL characters read are transferred normally to the area of the RAM reserved for them, while the following characters read will be used only for the polynomial CRC calculation (blocks 100-102) by inhibiting transfer to the RAM. In consequence, a final check on the pair of check characters CRCH and CRCL as explained hereinbefore is still possible even though the reading is limited to only part of the track. The usefulness of this service arises when it is desired to obtain an overall situation of the information in the file of cards. In such case, it is very useful to be able to transfer to memory only a first zone of the magnetic track containing the desired information.

This characteristic is, moreover, greatly valued in the case of microcomputers which are usually provided with a RAM having a limited capacity. It follows that the possibility of introducing into memory the data strictly necessary for the computation is manifested in an optimization of space and, therefore, in an increase in the computing capacity.

WRITING AND VERIFICATION INSTRUCTION: WRITE

Figure 9:
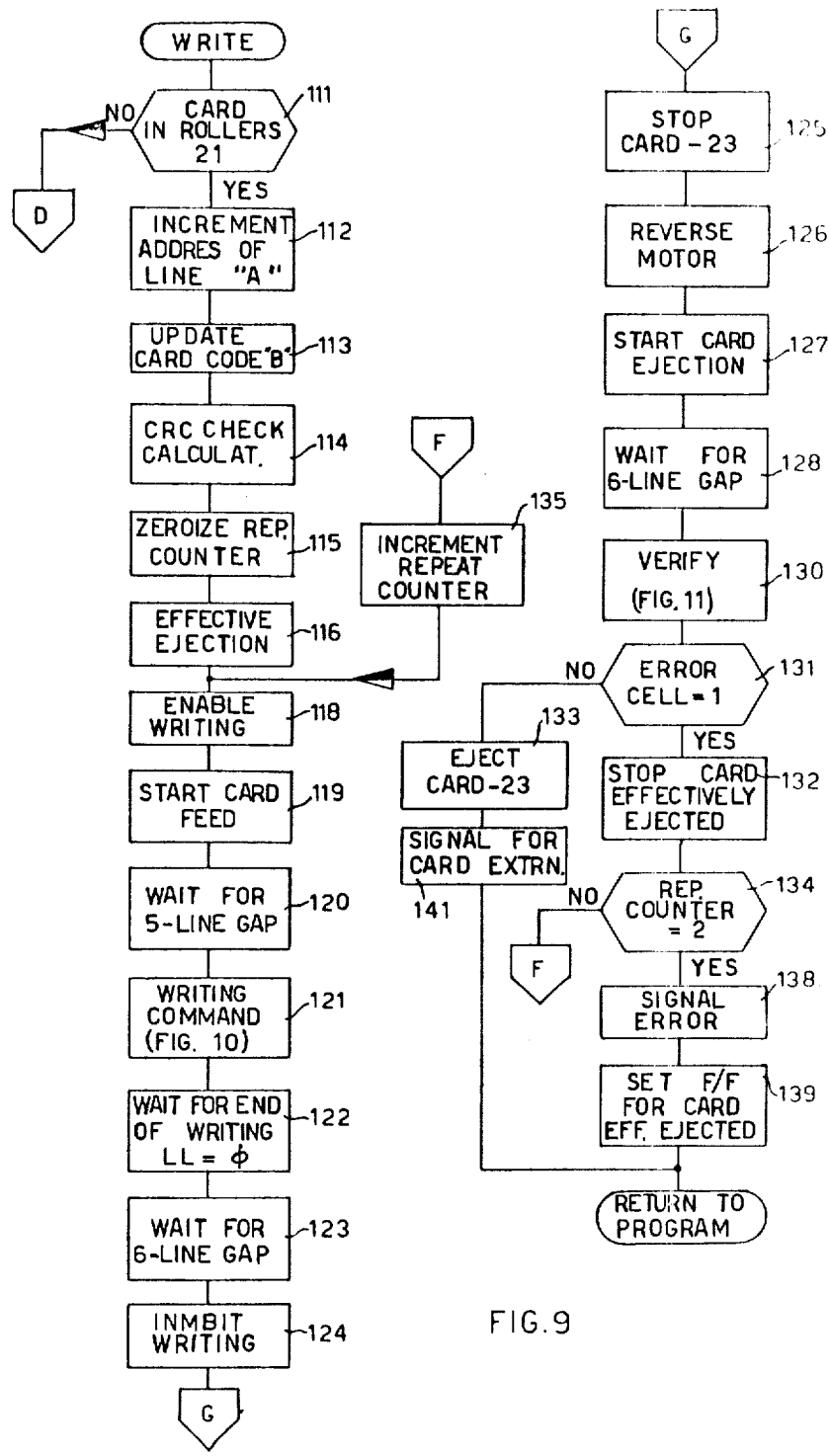
FIG. 9 shows the flow diagram of the instruction for writing on the magnetic track of the card.
Figure 11:
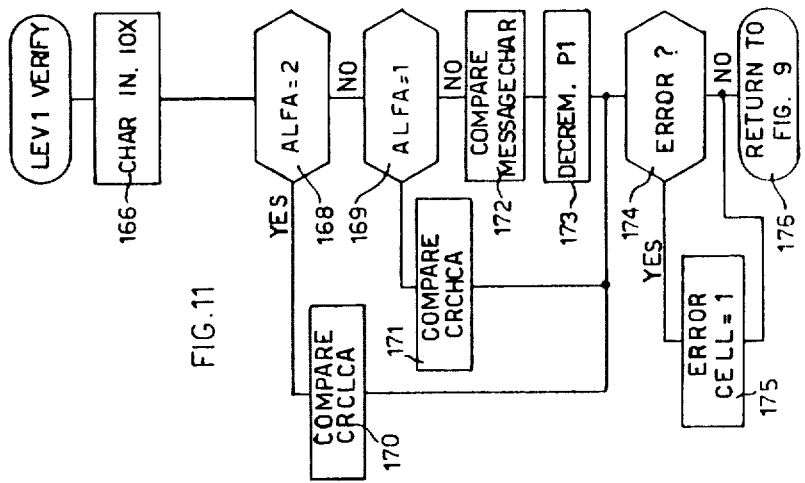
FIG. 11 shows the flow diagram of the verification of a character read from the magnetic track.
Figure 10:
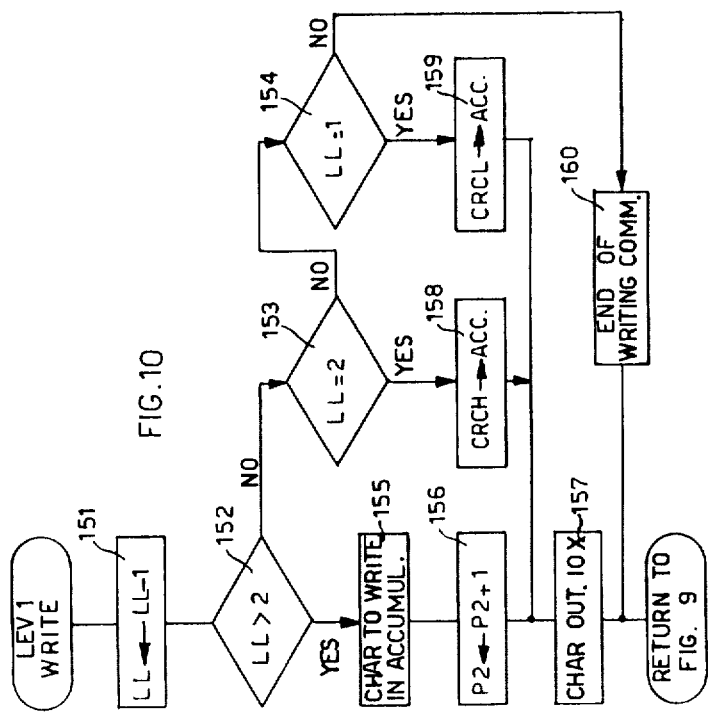
FIG. 10 shows the flow diagram of the writing of a character on the magnetic track.

The flow diagram of the microprogram which carries out the writing and verification instruction is shown in FIG. 9, while FIG. 10 concerns the writing of a character and FIG. 11 relates to the verification. Both the microprograms of FIGS. 10 and 11 are called by means of an interrupt of level 1.

The instruction begins with the block 111, which verifies whether the card is engaged in the rollers 21 (FIG. 1) as described in connection with the block 61 of the reading instruction. In the affirmative case, the writing is commenced, otherwise a jump is made to the block 80 of FIG. 8, which ends the instruction by signalling an error, as has been explained hereinbefore. The logical decision 111 serves to prevent writing on a card as soon as it in introduced, inasmuch as this is contrary to the logic of the use of such cards. In fact, the information given on the magnetic track summarizes the past history of the record represented by the card. This past history is indispensable to the program which handles this record and is, moreover, updated at the end of the processing operations concerning the card itself. This logic clearly provides for 1. reading a card as soon as it is introduced, and
2. writing on a card at the end of the processing operations.

On the other hand, when the card is engaged in the rollers, this means that at least one reading operation has been carried out on the card. This situation is consistent with the logic of the machine.

The blocks 112 and 113 update the field A (address of free line) and the field B (card code) of the track (FIG. 6). The block 114 performs the polynomial CRC calculation shown diagrammatically in FIG. 5. The block 115 sets to zero the counter RIP-49 which serves to carry out three attempts in all in the event of a verification error. In this way, at the beginning of each writing operation, the block 115 initializes the machine to carry out the writing in the event of error.

The block 116 brings the card back into the position indicated by the reference 10 in FIG. 1. The block 118 sends the command enabling writing to the control unit 6. The block 119 commands the movement of introduction of the card, while the block 120 adjusts the initial gap GI (FIG 6) counting five line-spacing interrupts. The block 121 executes the writing of the characters on the magnetic track by means of an interrupt of level 1 (FIG. 10). The block 122 waits for the end-of-writing signal activated by the block 160 (FIG. 10). The block 123 adjusts the final gap, while the block 124 inhibits writing. The block 125 arrests the movement of the card at the end of the writing, while the block 126 commands the starting of the motor with a direction of rotation opposite to the preceding direction. The block 127 commands the movement of ejection of the card, while the block 128 waits for the final gap GF to have passed below the magnetic head 12. The block 130 sends the command for verification, which is carried out by means of an interrupt handled by the microprogram of FIG. 11. This microprogram writes a "1" in the error cell 57 (FIG. 7) in the event of a writing error being found, as will be explained hereinafter. The logical decision 131 examines the cell 57 and executes the block 132 in the event of the cell 57 being at 1. The block 132 arrests the card in the position of effective ejection (position indicated by the reference 10 in FIG. 1) and prepares to repeat the writing and verification sequence hereinbefore explained. If, on the other hand, there has been no error in the verification stage, the block 133 is executed, which ejects the card. The block 141 which follows signals to the operator that the writing on the magnetic track has been completed and he must, therefore, extract the card.

Let us now go back to the logical decision 134, at which we had arrived because of a verification error. This logical decision examines whether the repeat counter (that is, the cell 49 of FIG. 7) contains the number two. In the affirmative case, the writing is stopped and an error is signalled, while in the case in which the contents of the cell 49 are less than two, the machine goes on to the block 135, which increments it by one. The operations are then repeated from the block 118. If three attempts have been made, the machine goes on to the block 138, which signals the writing error, setting the condition code at 2. Finally, the block 139 sets the effective ejection flip-flop.

The character writing microprogram given in FIG. 10 and called by the block 121 of FIG. 9 will now be described. The block 151 decrements the LL cell 45 in which is recorded the length of the field to be written taken from the parameter LL of the writing instruction. The logical decision 152 verifies whether the character to be written is not one of the last two. In the positive case (that is, LL is greater than 2), it executes the block 155 which writes the next character extracted from the RAM. In the affirmative case (LL = 2), it provides for writing the check character CRCH by means of the block 158 and, in the case of LL = 1, it writes the character CRCL by means of the block 159. From the block 155 the microprogram goes on to the block 156, which increments the address pointer P1 of the zone of the RAM from which the message is read. The block 157 sends the character to be written by means of a character output microinstruction IOX. The check characters, on the other hand, are read from the cells indicated by the reference 47, 47' in FIG. 7 and formed part of the reserved memory zone. These cells constitute the final result of the polynomial calculation shown in FIG. 5. Finally, the block 160 sends the end-of-writing command for the current message.

The verification microprogram shown in FIG. 11 will now be described. This microprogram carries out the block 130 of FIG. 9 and is called by the interrupt generated by the logic 6 as stated hereinbefore. It is to be noted that at the beginning of the verification the card is positioned at the last character, that is CRCL, written. The initial block 166 sends the verification character input microinstruction IOX. As has been seen with reference to FIG. 2b, this microinstruction sets the two signals SMU10 and SMU20 at 1, which signals select the fourth and eighth inputs of the multiplexers 35A-35D. This corresponds to reversing the order of the bits read on the output bus BUD10-80. Since the card is read in the opposite direction to that of writing, the final result is that on the bus BUD10-80 the bits are in the same order in which they have been written. This results in another advantage, that is of carrying out the reading in the verification stage using the reverse movement of the card. In default of the multiplexer 35 and of the verification character input microinstruction IOX, it is necessary to reposition the card with the bottom edge aligned on the rollers and then proceed with the reading for verification. If the verification is positive, it would be necessary to re-eject the card. With the system described, on the other hand, the number of movements of the card is halved: in fact, the card is first written on during introduction, then returns verified during ejection. If the verification is positive, the card is already in the ejection position; on the other hand, if the verification is negative, the card is already in the writing position for impressing a fresh writing and verification cycle. The logical decision 168 examines the state of the ALFA cell 59, which contains two at the beginning of the verification. This cell enables comparison in a special manner of the first two characters to be verified, inasmuch as this is a question of the check characters which are not written or recorded in the area of the RAM reserved for the message, but in the reserved memory zone. In fact, these comparisons are carried out by the blocks 170 and 171 and do not modify the memory addresser. The characters following the second are compared by the block 172, which uses the pointer P1 to call in the comparison character from the free zone of the RAM. The block 173 decrements this pointer. It is to be noted that the memory addresser is decremented instead of incremented, inasmuch as the comparison commences from the last character written and ends with the block "A" (see FIGS. 2c and 61). The logical decision 174 examines the result of the comparison and, in the case of an error (block 175) puts 1 into the error cell 57, which, as has been said, is examined by the microprogram of FIG. 9 (logical decision 131).

CONCLUSION

It is apparent from the present description how the control unit for a front insertion device for cards having a magnetic track offers the following advantages:

1. It enables the execution three times of the operations inherent in reading, or if those inherent in writing with verification, of the magnetic track. If an error is recognised three times, then the introduction is stopped and the error is signalled to the operator.

2. It enables verification of the characters written on the magnetic track to be carried out using the movement of ejection of the card itself. This verification takes place with a direction of movement opposite to that of writing and, consequently, the written message is verified from the end to the beginning.

3. The reading instruction enables the data written on the magnetic track to be read also only in part, with consequent optimization of the occupation of the user memory. This service is manifested in an increase in the available memory for equality of information written on the magnetic track.

What I claim is:

1. A computerized accounting system for reading and writing information comprising:
   a first memory for storing microinstructions arranged in a plurality of microprograms;
   a processor connected to said first memory for processing said plurality of microprograms;
   at least one peripheral unit connected to said processor for processing cards having a magnetic track, said peripheral unit including an insertion device for handling said cards and a control unit connected to said insertion device and said processor for enabling said peripheral unit to perform reading or writing operations in response to particular microprograms stored in said first memory and processed by said processor, said control unit including means for writing information on said magnetic track during said writing operation and means for reading information from said magnetic track during said reading or writing operations;
   a first register connected to said processor adapted to record the number of times that an operation of reading or writing on said magnetic track has been executed, wherein said processor comprises error detecting means responsive to said reading means for detecting reading or writing errors in said magnetic track during said reading or writing operations and repeating means responsive to the contents of said first register and said error detecting means for repeating the operation until either the operation is performed without an error being detected or said first register indicates that the operation has been repeated a predetermined number of times.

2. A system according to claim 1, further comprising:
   a second memory connected to said processor for storing information to be written on said magnetic track of said card during said writing operation, wherein said control unit further includes means for reversing the order of the information read by said reading means and wherein said error detecting means in said processor comprises:
   means responsive to said writing means for reversing the movement of said card at the conclusion of said writing operation;
   means for enabling said reading means and said information reversing means during the reverse movement of said card;
   and means for comparing the information recorded in said second memory means with the information coming from said information reversing means during said reverse movement of said card.

3. A system according to claim 2, further comprising:
   a second register controlled by said comparison means for recording an error condition, said error detecting means in said processor further comprising means for examining the contents of said second register and for enabling said repeating means to effect a repeat of the writing and reading operations in the presence of said error condition.

4. A system according to claim 3 wherein said information includes a plurality of characters, said accounting system further comprising:
   a third register programmable to store the number of characters to be read on said magnetic track;
   and a transit register connected to said reading means for storing the characters read from said magnetic track for transfer to said error detecting means and said second memory, said processor further comprising:
   means for decrementing the contents of said third register for each character read;
   and means for examining the contents of said third register and for inhibiting the transfer of the characters read from said transit register to said second memory when the content of said third register is equal to zero, so that the characters subsequently read are sent only to the said means for detecting the errors, whereby the transfer from said transit register to said second memory is inhibited.

* * * * *